United States Patent [19]

Lloyd et al.

[11] Patent Number: 4,487,796
[45] Date of Patent: Dec. 11, 1984

[54] LAMINATED, CREPED TISSUE AND METHOD OF MANUFACTURE

[75] Inventors: William D. Lloyd, Neenah; Richard W. Evers, Appleton, both of Wis.

[73] Assignee: Kimberly-Clark Corporation, Neenah, Wis.

[21] Appl. No.: 279,806

[22] Filed: Jul. 2, 1981

[51] Int. Cl.³ .......................... B32B 29/00; B32B 3/28
[52] U.S. Cl. ..................................... 428/154; 156/183; 156/291; 162/112; 162/132; 428/211; 428/535
[58] Field of Search ............... 428/153, 154, 211, 535; 162/111, 112, 113, 117, 132, 134; 156/183, 291

[56] References Cited

U.S. PATENT DOCUMENTS

| | | | |
|---|---|---|---|
| 2,704,106 | 3/1955 | Doyle et al. | 428/154 |
| 3,047,445 | 7/1962 | Gresham | 428/154 |
| 4,158,594 | 6/1979 | Becker et al. | 156/291 |
| 4,225,382 | 9/1980 | Kearney et al. | 162/132 |

*Primary Examiner*—Paul J. Thibodeau
*Attorney, Agent, or Firm*—Gregory E. Croft

[57] ABSTRACT

A method of laminating a two-ply product wherein the plies are laminated to one another and adhered to a creping surface in the same pattern. A first ply is directed about a patterned pressure and imprinting roll and laminating adhesive is applied to the first ply in a pattern corresponding to the pattern of the pressure roll. A second ply is brought into contact with the first ply, and the composite web is adhered to a creping surface with a creping adhesive at a nip formed between the creping surface and the patterned pressure roll. The composite web is creped from the creping surface in a pattern corresponding to the pattern of lamination. When creped, the densified laminated/creped portions add strength to the resulting product, while between the densified areas the webs are not adhered to one another and the void areas therebetween provide sites for water absorption. In a second embodiment, an endless fabric or belt may be directed about a smooth pressure roll, such that the knuckles of the fabric laminate the plies to one another and adhere the composite web to the creping cylinder in the same pattern.

11 Claims, 5 Drawing Figures

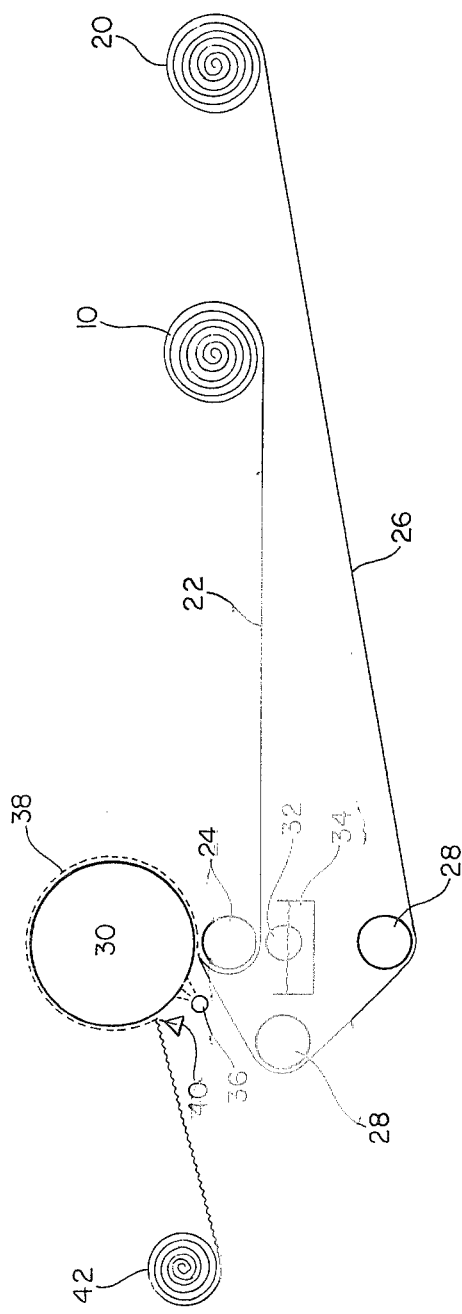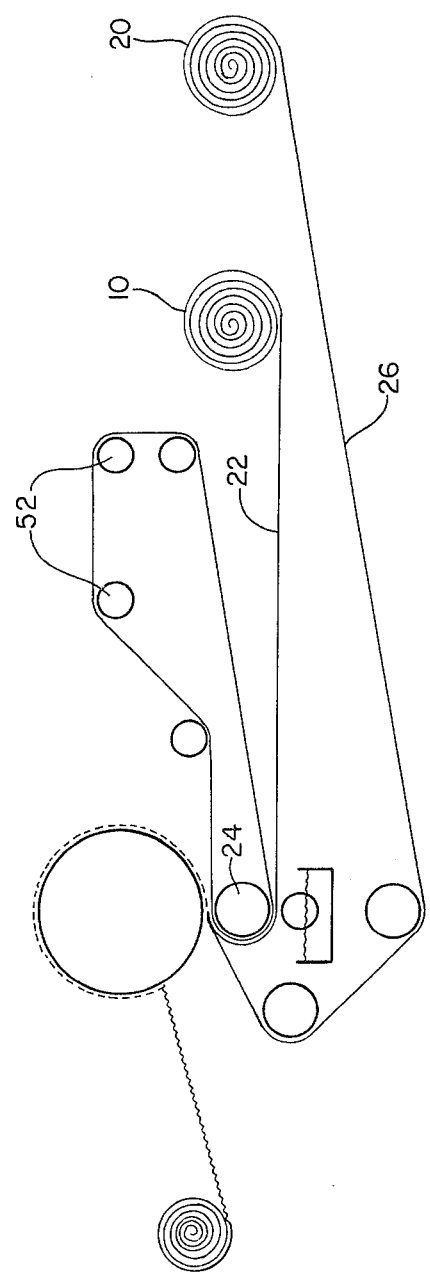

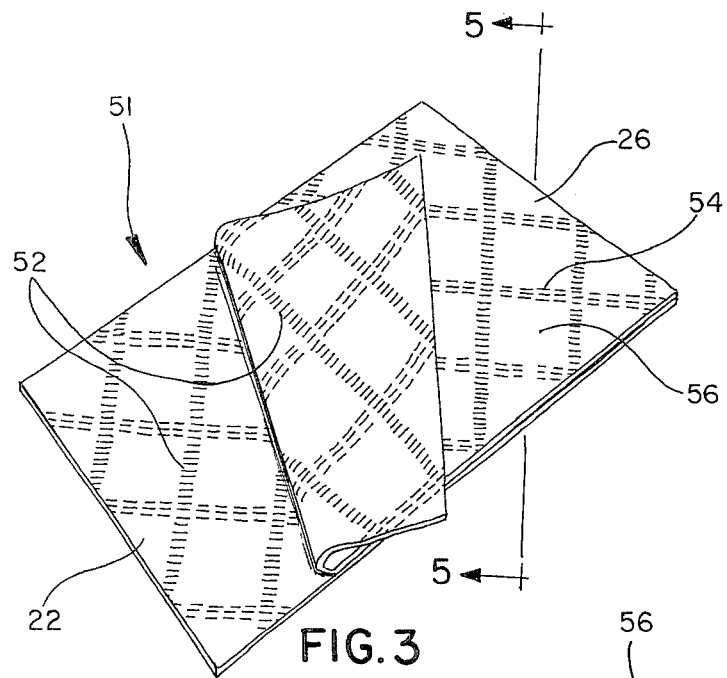
FIG. 3
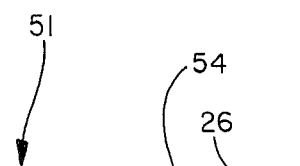
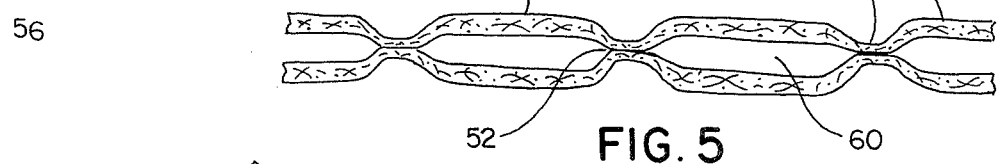
FIG. 5
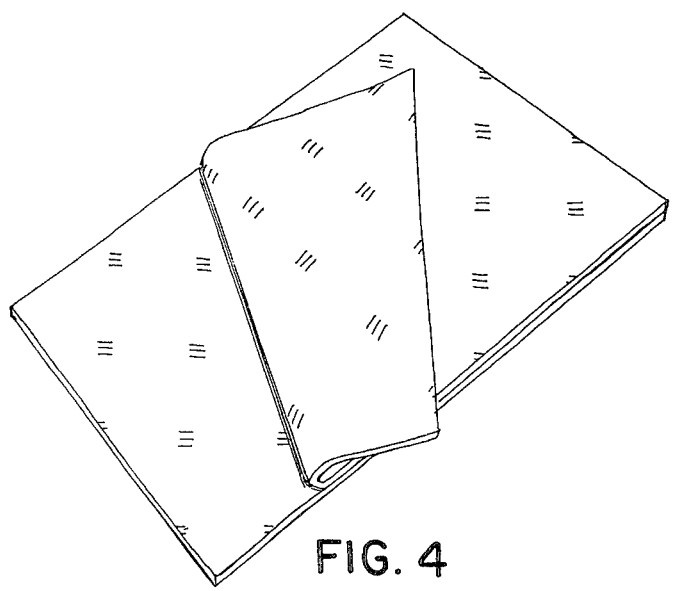
FIG. 4

LAMINATED, CREPED TISSUE AND METHOD OF MANUFACTURE

BACKGROUND OF THE INVENTION

In searching for increasingly softer and more absorbent disposable towel products, various technologies have been proposed as improvements over the prior art towel products. Traditionally, towel products have been either formed in two plies which are subsequently combined (with or without embossing) or as a single ply with a very high basis weight. Embossing of two-ply products substantially increases the resultant bulk and therefore the consumer perception of softness, and had been the preferred high basis weight product for many years.

Two-ply products have been manufactured either with a laminating adhesive to hold the plies together, or the plies have been jointly embossed so that the embossments effect the lamination. While the embossed products have traditionally exhibited increased consumer perception of softness over a comparable one-ply product, the ply-degradation due to embossing substantially degraded the sheet strength. Two-ply glue-laminated products are usually more absorbent (due to the large void areas between the plies) and stronger than one-ply products, but they have still not exhibited what are believed to be maximum product qualities, especially softness.

An alternative to two-ply towel products are the new generation one-ply products which have competed successfully in the marketplace for some time. While one-ply products may be substantially less absorbent then two-ply products, and without embossing or creping may be quite stiff, they have been considered an economic alternative to two-ply products because they require substantially less converting equipment. In an effort to increase the strength and softness of one-ply products, product improvements are noted in a series of patents issued to the Scott Paper Company, including U.S. Pat. Nos. 3,903,342, Roberts, Jr., 4,208,459, Becker et al and 4,158,594, Becker et al. In these patents, it is proposed to apply a bonding material to a web in a fine pattern, the bonding material serving to bond fibers within the web to add strength thereto, as well as acting as a creping adhesive producing a patterned, differential crepe. The single ply is characterized by high strength (due to the addition of bonding materials in an amount equal to at least 1.4% non-volatile constituents based upon the dry weight of the web), high bulk due to the creping process and softness resulting from the patterned crepe disrupting many of the harsh papermaking bonds.

The Scott patents dealing with single ply products recognized a heretofore unsolved problem with two-ply towel weight products: the finished product should be creped to add softness and bulk. If the plies of a two-ply product had been laminated with embossing, a pressure application to a creping cylinder would de-emboss the web and negate the benefits of the embossment. If the two-ply product had been gluelaminated, attempting to crepe the product would merely crepe one side, since the crepe would not "strike through" to the noncreped ply. Therefore, two-ply products have not heretofore been creped after lamination has been effected. While the one-ply products produced by the processes described in the patents noted above function quite well as towel products, many existing papermaking machines are not adapted to make a single ply towel product (such as 30 to 50 pounds per 2880 square feet), and are therefore limited to making two-ply products. Such machines may be limited to forming sheets having lower basis weights due to limitations in their forming sections. For instance, many "twin-wire" machines inject the fiber stock slurry between two rapidly converging papermaking wires, and basis weight nonuniformities are exacerbated as the basis weight increases. Additionally, some machines may not be operated efficiently at the lower rates of speed necessitated by the high basis weight, such slower speeds being required due to the drying limitations imposed when drying high basis weight webs.

Therefore, a process which would enable a papermaker to produce a two-ply towel product having the increased softness and bulk of new generation single ply towel products would find immediate application to existing papermaking machines.

SUMMARY OF THE INVENTION

In the present invention, there are two rolls of tissue or towel products which are unrolled simultaneously and formed into a two-ply product. A laminating adhesive is applied to a first ply as it is directed about a patterned pressure roll and the second ply is brought into contact with the first ply at a nip between the pressure roll and a creping cylinder, thereby effecting lamination of the two plies in the pattern of the pressure roll. Creping adhesive is sprayed onto the surface of the creping cylinder (or into the web) and the two-ply web is adhered to the creping surface in a pattern corresponding to the pattern of lamination. The web is thereafter creped from the creping surface, resulting in a product having a pattern of lamination and a creping pattern corresponding to one another.

The pattern of the pressure roll may result from a roll having an engraved surface with land areas which effect lamination and adhesion to the creping surface, or alternatively, an endless fabric may be directed about a smooth pressure roll so that the knuckles of the fabric effect lamination and adhesion.

The plies of the web of the present invention may be comprised of cellulosic fibers, synthetic fibers or combinations thereof. The webs may be conventionally formed and dried, throughdried or formed by an "air-forming process". The laminating adhesive may be chosen depending upon the product attributes desired, and may preferably be a nonwater—receptive adhesive which is adapted to increase the wet and dry strength of the web in those areas to which it is applied.

The basis weight of each of the plies may be from 10 lbs. to 30 lbs., thereby producing a finished two-ply product having a basis weight of from 20 to 60 per 2880 square feet.

BRIEF DESCRIPTION OF THE DRAWINGS

FIG. 1 is a schematic view of a process according to the present invention;

FIG. 2 is a schematic view, similar to that of FIG. 1, showing a second embodiment of the process of the present invention;

FIG. 3 is an isometric view illustrating a two-ply product of the present invention;

FIG. 4 is an isometric view illustrating a second embodiment of the two-ply product of the present invention, and FIG. 5 is a sectional view taken along line 5—5 of FIG. 3.

DESCRIPTION OF THE PREFERRED EMBODIMENT

As seen in FIG. 1, the present invention comprises a pair of "soft rolls" 10 and 20 which had previously been manufactured according to any conventional creped wadding or tissue process. For instance, the rolls 10, 20 may be manufactured by a conventional forming, drying and creping process, by a conventional wet forming process followed by "throughdrying", or by "air-laying" dry fibers with subsequent bonding. After manufacture, the soft rolls are either stored for subsequent conversion into a two-ply product, or one ply may be converted in-line with the second roll being provided from storage.

The rolls 10, 20 are unwound at the same rate of speed (such as, 2,500 feet per minute), with the web 22 of roll 10 being directed about a patterned pressure/imprinting roll 24. Web 26 of roll 20 is directed about one or more turning rolls 28 prior to being combined with web 22 at the nip formed between roll 24 and creping cylinder 30. The webs 22, 26 may be of any desired basis weight, but for a towel product, preferably from 10 pounds to 30 pounds per 2880 square feet. Adhesive is applied to web 22, as by rotogravure or other applicator roll 32, which effects lamination between webs 22 and 26 corresponding to the pattern of roll 24. A relatively small amount of pressure is applied from roll 32 to web 22 and roll 24 so that the adhesive 34 is transferred to web 22 only at the raised land areas of roll 24.

Creping adhesive is applied to creping cylinder 30, as at 36, upstream of patterned pressure/imprinting roll 24 so that the composite web 38 is adhered to creping cylinder 30 in a pattern corresponding to the pattern of ply lamination. The pressure in the nip between rolls 24 and 30 may be approximately 200 pli, which may be adjusted depending upon the creping adhesive used, basis weight, creping cylinder 30 temperature, etc. The composite web 38 is creped from creping cylinder 30 by doctor blade 40, and the finished two-ply laminated towel product is reeled into a roll of finished product 42 suitable for conversion into consumer products.

An alternative embodiment of the present invention is seen in FIG. 2, similar in all respects to FIG. 1, except that an endless fabric or belt 50 is directed about patterned pressure/imprinting roll 24 and a series of turning or tensioning rolls 52. Fabric 50 may be any conventional woven fabric having "knuckles" thereon resulting from the cross-over of woven filaments, the knuckles being analogous to the raised land areas of roll 24 in FIG. 1 and effecting the lamination between webs 22 and 26, and causing the composite web 38 to be adhered to creping cylinder 30 in the pattern corresponding to the pattern of lamination.

It is to be understood that any desirable pattern may be provided on the patterned pressure/imprinting roll 24 which will provide the most desirable combination of ply laminating qualities as well as creping characteristics resulting from the pattern. For instance, the pattern may take the form of a continuous cross-hatch dots, squares, sine waves, etc.

It is also to be appreciated that the webs 22 and 26 may be comprised of any conventional papermaking fibers, such as cellulose, or may include synthetic fibers such as polypropylene, rayon, or nylon. Indeed, the present invention may be particularly adapted for use with higher basis weight air-formed sheets which comprise a blend of cellulose and synthetic fibers. Additionally, the laminating adhesive 34 may be selected depending upon the ultimate product qualities desired. For instance, if it is desired to add wet strength to the finished product, the laminating adhesive may be selected from a group of nonwater receptive adhesives (such as ethylene vinyl acetate latexes) which will maintain the integrity of the plies even when the towel is wetted.

As seen in FIG. 3, a two-ply laminated creped sheet, generally designated 51 comprises a first dryerside ply 26 and a second ply 22 which are laminated in the cross hatch pattern indicated at 52, and creped in the same cross hatch pattern indicated at 54. Because the plies 22 and 26 are applied to the creping cylinder 30 in the pattern corresponding to the pattern of lamination, with pressure, sufficient adhesive (either creping adhesive 36 or laminating adhesive 34) penetrates through the entire thickness of the composite web 38 to permit the subsequent creping action to "strike through" the entire web, thereby creping both sides and disrupting the papermaking bonds in the pattern corresponding to the pattern of roll 24 or fabric 50. Those areas 56 between the creped laminated portions of web 22 and 26 are not compressed between the patterned pressure roll 24 and creping cylinder 30, and therefore retain substantially greater bulk than the creped/laminated areas.

As seen in cross section in FIG. 5, the webs 22, 26 forming product 51 are securely adhered to one another at the sites of lamination 52, which correspond with the sites of creping 54. The plies 22 and 26 are not adhered to one another over a substantial portion of their surfaces thereby creating void areas 60 between the plies. The densified areas 52, 54 add significant strength to the finished product, while the void areas 60 permit the absorption of water.

FIG. 4 represents a laminating and crepe pattern resulting from the use of typical knuckled fabric as illustrated in FIG. 2. The pattern of densified areas shown in FIG. 4 may be selected to provide optimal cross direction stretch, minimum surface area compaction, or any other desired quality.

What is claimed is:
1. A method of forming a laminated multi-ply absorbent web comprising:
  (a) applying a laminating adhesive to an inner surface of a first ply as said first ply is directed around a patterned pressure roll;
  (b) bringing an inner surface of a second ply into contact with the inner surface of the first ply as said first and second plies are directed between said patterned pressure roll and a creping cylinder;
  (c) applying pressure to said first and second plies in a nip formed between said patterned pressure roll and said creping cylinder such that said first and second plies are laminated to one another so as to form a composite web having a pattern of lamination corresponding to the pattern of said patterned pressure roll;
  (d) applying creping adhesive to said creping cylinder such that said composite web is affixed to said creping cylinder in the pattern of said lamination, and
  (e) differentially creping said composite web from said creping cylinder.

2. The method as recited in claim 1, wherein said patterned pressure roll is provided with engraved pattern thereon.

3. The method as recited in claim 1, wherein said patterned pressure roll is a smooth surfaced roll provided with an endless fabric directed thereabout, such that a knuckle pattern of filaments within said fabric produces a pattern of lamination and adhesion to said creping cylinder.

4. The method as recited in claim 1, wherein the pressure between said patterned pressure roll and said creping cylinder is from about 50 pli to about 300 pli.

5. The method as recited in claim 1, wherein said first and second plies are provided as cellulosic webs having a basis weight of from about 10 pound to about 30 pounds per 2880 square feet.

6. The method as recited in claim 1, wherein said laminating adhesive is applied to said first ply in an amount equal to approximately 4% based on the weight of the dry web.

7. An absorbent multi-ply creped disposable towel comprising:
  (a) a first ply;
  (b) a second ply adhesively laminated to said first ply in a pattern corresponding to the pattern of a patterned pressure roll, and
  (c) a crepe pattern in said towel corresponding to the pattern of said patterned pressure roll and the pattern of lamination of said first and second plies.

8. The towel as recited in claim 7, wherein said first and second plies comprise predominantly cellulosic fibers.

9. The towel as recited in claim 7, wherein one or both of said plies comprise a mixture of cellulosic and synthetic fibers.

10. The towel as recited in claim 7, wherein said first and second plies are provided with a basis weight from about 10 pounds to about 30 pounds per 2880 square feet.

11. The towel as recited in claim 8, wherein said adhesive is a nonwater receptive adhesive adapted to increase the strength of said towel.

* * * * *